United States Patent
Wagner et al.

(10) Patent No.: US 6,852,144 B1
(45) Date of Patent: Feb. 8, 2005

(54) METHOD FOR REMOVING COS FROM A STREAM OF HYDROCARBON FLUID AND WASH LIQUID FOR USE IN A METHOD OF THIS TYPE

(75) Inventors: Rupert Wagner, Worms (DE); Randolf Hugo, Dirmstein (DE); Thomas S. Holst, Calgary (CA)

(73) Assignee: BASF Aktiengesellschaft, Ludwigshafen (DE)

( * ) Notice: Subject to any disclaimer, the term of this patent is extended or adjusted under 35 U.S.C. 154(b) by 162 days.

(21) Appl. No.: 10/088,501

(22) PCT Filed: Oct. 4, 2000

(86) PCT No.: PCT/EP00/09704

§ 371 (c)(1),
(2), (4) Date: Mar. 28, 2002

(87) PCT Pub. No.: WO01/24912

PCT Pub. Date: Apr. 12, 2001

(30) Foreign Application Priority Data

Oct. 5, 1999 (DE) .......................................... 199 47 845

(51) Int. Cl.$^7$ ................................................. B01D 53/14
(52) U.S. Cl. .............................. 95/181; 95/235; 95/236; 423/228; 423/242.7
(58) Field of Search .......................... 95/181, 235, 236; 423/228, 229, 242.7

(56) References Cited

U.S. PATENT DOCUMENTS

| 3,622,267 A |   | 11/1971 | Bartholome et al. |
| 3,664,091 A | * | 5/1972 | Hegwer |
| 3,989,811 A | * | 11/1976 | Hill |
| 4,080,424 A | * | 3/1978 | Miller et al. |
| 4,233,141 A | * | 11/1980 | Beavon et al. |
| 4,336,233 A |   | 6/1982 | Appl et al. |

(List continued on next page.)

FOREIGN PATENT DOCUMENTS

| CA | 1 291 321 | 10/1991 |
| CA | 1 295 810 | 2/1992 |
| DE | 0 542 415 | 4/1970 |
| DE | 1 904 428 | 8/1970 |
| EP | 0 322 924 | 7/1989 |
| GB | 1 058 304 | 7/1964 |
| WO | 00 66249 | 11/2000 |

OTHER PUBLICATIONS

Maddox et al., "Gas Conditioning and Processing", Gas Treating and Sulfur Recovery, Chapter 6, pp. 247–253, 1985.
Rib et al., "Coal, –Gas Cleanup Facility", Environmental Progress, vol. 2, No. 2, May 1983, pp. 86–89.
Ferrell et al., "Performance and Modelling of a Hot Potassium Carbonate Acid Gas Removal System in Treating Coal Gas", EPA Report No. EPA/600/7 87/023, Nov. 1987, pp. 58–59.

*Primary Examiner*—Duane S. Smith
(74) *Attorney, Agent, or Firm*—Oblon, Spivak, McClelland, Maier & Neustadt, P.C.

(57) ABSTRACT

COS is selectively removed with respect to $CO_2$ from a hydrocarbonaceous fluid stream which contains $CO_2$ and COS. Examples of the fluid stream include a gas stream, for example natural gas, synthesis gas from heavy oil or heavy residues or refinery gas, or from liquid or liquefied hydrocarbons, for example LPG (Liquefied Petroleum Gas) or NGL (Natural Gas Liquids). The process is carried out by (1) intimately contacting the fluid stream in an absorption or extraction zone with a scrubbing liquor consisting of an aqueous amine solution containing from 1.5 to 5 mol/l of an aliphatic alkanolamine having of from 2 to 12 carbon atoms and from 0.8 to 1.7 mol/l of at least one activator selected from the group consisting of piperazine, methyl piperazine and morpholine, (2) removing the COS essentially completely from the fluid stream, and (3) separating the substantially COS-decontaminated fluid stream and the COS-loaded scrubbing liquor and discharging them from the absorption or extraction zone.

14 Claims, 3 Drawing Sheets

U.S. PATENT DOCUMENTS

| | | | |
|---|---|---|---|
| 4,368,059 A | * | 1/1983 | Doerges et al. |
| 4,372,925 A | * | 2/1983 | Cornelisse |
| 4,384,875 A | * | 5/1983 | Batteux et al. |
| 4,414,004 A | * | 11/1983 | Wagner et al. |
| 4,460,385 A | * | 7/1984 | Pan et al. |
| 4,462,968 A | | 7/1984 | Tazuma et al. |
| 4,484,934 A | * | 11/1984 | Ferrin et al. |
| 4,504,449 A | * | 3/1985 | Doerges et al. |
| 4,537,753 A | | 8/1985 | Wagner et al. |
| 4,545,965 A | * | 10/1985 | Gazzi et al. |
| 4,551,158 A | * | 11/1985 | Wagner et al. |
| 4,553,984 A | | 11/1985 | Volkamer et al. |
| 4,749,555 A | * | 6/1988 | Bush |
| 4,808,765 A | | 2/1989 | Pearce et al. |
| 4,840,648 A | * | 6/1989 | Grunewald et al. |
| 4,959,086 A | * | 9/1990 | Van Baar et al. |
| 4,999,031 A | | 3/1991 | Gerhardt et al. |
| 5,209,914 A | * | 5/1993 | Peytavy et al. |
| 5,277,885 A | * | 1/1994 | Peytavy et al. |
| 5,348,714 A | | 9/1994 | Peytavy et al. |
| 5,877,386 A | | 3/1999 | Schubert |
| 6,102,987 A | * | 8/2000 | Gross et al. |
| 6,436,174 B1 | * | 8/2002 | Grossmann et al. |
| 2002/0104438 A1 | * | 8/2002 | Cadours et al. |
| 2002/0139717 A1 | * | 10/2002 | Titley et al. |

* cited by examiner

US 6,852,144 B1

METHOD FOR REMOVING COS FROM A STREAM OF HYDROCARBON FLUID AND WASH LIQUID FOR USE IN A METHOD OF THIS TYPE

BACKGROUND OF THE INVENTION

Field of the Invention

The present invention relates to a process for removing COS from a COS-containing hydrocarbonaceous fluid stream, especially from a gas stream, for example natural gas, synthesis gas from heavy oil or heavy residues or refinery gas, or from liquid or liquefied hydrocarbons, for example LPG (Liquefied Petroleum Gas) or NGL (Natural Gas Liquids), and also a scrubbing liquor for use in such processes.

Discussion of the Background

Numerous processes in the chemical industry give rise to fluid streams comprising acid gases, for example $CO_2$, $H_2S$, $SO_2$, $CS_2$, HCN, COS or mercaptans as impurities.

The LPG or gas streams in question here can be for example hydrocarbonaceous gases from a natural gas source, synthesis gases from chemical processes or, say, reaction gases involved in the partial oxidation of organic materials, for example coal or petroleum. The removal of sulfur compounds from these fluid streams is of particular importance for various reasons. For instance, the level of sulfur compounds in natural gas has to be reduced by suitable processing measures immediately at the source of a natural gas, since the natural gas will customarily also contain a certain fraction of entrained water as well as the above-recited sulfur compounds. In aqueous solution, however, these sulfur compounds are present as acids and have a corrosive effect. To transport natural gas in a pipeline, therefore, predetermined limits must be complied with for the sulfur-containing impurities. In addition, numerous sulfur compounds are malodorous and—with hydrogen sulfide ($H_2S$) a prime example—extremely toxic even at low concentrations.

Similarly, the $CO_2$ content of hydrocarbonaceous gases, such as natural gas, customarily has to be significantly reduced, since high concentrations of $CO_2$ reduce the calorific value of the gas and may likewise cause corrosion to pipework and fittings.

There are therefore numerous processes already in existence for removing acid gas constituents from fluid streams such as hydrocarbonaceous gases, LPG or NGL. In the most widely used processes, the fluid mixture containing acid gases is contacted with an organic solvent (or with an aqueous solution of an organic solvent) in a gas scrub or a liquid—liquid extraction. There is extensive patent literature on gas scrub processes and the scrubbing solutions used in these processes. In principle, two different kinds of gas scrub solvents can be distinguished:

On the one hand there are physical solvents, which rely on a physical absorption process, i.e., the acid gases dissolve in the physical solvent. Typical physical solvents are cyclotetra-methylene sulfone (sulfolane) and its derivatives, aliphatic acid amides, NMP (N-methylpyrrolidone), N-alkylated pyrrolidones and corresponding piperidones, methanol and mixtures of dialkylethers of polyethylene glycols SELEXOL®, Union Carbide, Danbury, Conn., USA).

On the other hand, there are chemical solvents which work on the basis of chemical reactions which convert the acid gases into compounds which are simpler to remove. For instance, the most widely used chemical solvents in industry, aqueous solutions of alkanolamines, form salts when acid gases are passed through, and these salts can either be decomposed by heating and/or stripped off by means of steam. The alkanolamine solution is regenerated in the course of the heating or stripping, so that it can be re-used. Preferred alkanolamines used for removing acid gas impurities from hydrocarbonaceous gas streams include monoethanolamine (MEA), diethanolamine (DEA), triethanolamine (TEA), diisopropylamine (DIPA), aminoethoxyethanol (AEE) and methyldiethanolamine (MDEA).

Primary and secondary alkanolamines are particularly suitable for gas scrubs where the purified gas has to have a very low $CO_2$ content (e.g., 10 ppm$_v$ of $CO_2$). To remove $H_2S$ from gas mixtures having a high original $CO_2$ content, however, it has been found to be disadvantageous that the effectiveness of the solution for removing $H_2S$ is much reduced by an accelerated absorption of $CO_2$. In addition, the regeneration of solutions of primary and secondary alkanolamines consumes large volumes of steam.

The European patent application EP-A-0 322 924 discloses, for example, that tertiary alkanolamines, especially MDEA, are particularly suitable for a selective removal of $H_2S$ from gas mixtures containing $H_2S$ and $CO_2$.

The German patent application DE-A-1 542 415 proposes increasing the effectiveness not only of physical solvents but also of chemical solvents by addition of monoalkylalkanolamines or of morpholine and its derivatives. The German patent application DE-A-1 904 428 describes the addition of monomethylethanolamine (MMEA) as an accelerant to improve the absorption properties of an MDEA solution.

U.S. Pat. No. 4,336,233 describes one of the currently most effective scrubbing liquors for removing $CO_2$ and $H_2S$ from a gas stream. It is an aqueous solution of about 1.5 to 4.5 mol/l of methyldiethanolamine (MDEA) and 0.05 to 0.8 mol/l preferably up to 0.4 mol/l, of piperazine as absorption accelerant or activator (aMDEA®, BASF AG, Ludwigshafen). The removal of $CO_2$ and $H_2S$ using MDEA is further described in greater detail in the following commonly assigned patents: U.S. Pat. No. 4,551, 155; U.S. Pat. No. 4,553,984; U.S. Pat. No. 4,537,753; U.S. Pat. No. 9,999,031, CA 1 291 321 and CA 1 295 810. U.S. Pat. No. 4,336,233 also says that an aqueous solution of methyldiethanolamine and piperazine achieves only partial removal of COS from a gas stream. It is further stated therein that, for a substantially complete removal of COS, the COS has to be converted in a conventional manner into simpler-to-remove compounds such as $CO_2$ and $H_2S$, for example by hydrolysis or by hydrogenation, say in the presence of hydrogen over cobalt-molybdenum-aluminum catalysts, prior to practice of the amine scrub.

COS is a compound which occurs essentially in gases from partial oxidations and also in natural gas. In natural gas, the COS results from the condensation reaction of $CO_2$ and $H_2S$.

Whereas the removal of $CO_2$ and $H_2S$ from hydrocarbonaceous streams is nowadays relatively straightforward, the main danger of specifications being exceeded with regard to maximum sulfur content comes from inadequate removal of COS. COS may be detected for example by the copper strip test for sulfur. In this test, the COS hydrolyzes back to $CO_2$ and $H_2S$ and can consequently be detected as $H_2S$. During the production of liquefied gases, such as LPG or NLG, COS may build up if the liquor gas is obtained separately by fractionation, for example from natural gas in the case of NLG. As will be expected from its volatility, the COS then accumulates in the propane fraction, necessitating a specific propane treatment.

When absorbers are used, COS is far less well absorbed than $H_2S$, so that the breakthrough of COS takes place far ahead of the breakthrough of the $H_2S$. Since the absorbers which are customarily used in addition catalyze the condensation of $H_2S$ and $CO_2$ to form COS to some degree, there is a danger even with initially substantially COS-free gas that the sulfur of the $H_2S$ will pass through the adsorption bed in the form of COS. In the case of synthesis gases, the remaining COS is converted to $H_2S$ over a shift catalyst and has to be removed as $H_2S$ in a further cleaning step.

The literature contains a variety of proposals for removing COS from sulfurous fluid streams:

Rib et al. in *"Performance of a Coal Gas Cleanup Process Evaluation Facility"*, presented at AIChE Spring National Meeting, Jun. 9, 1982, describe a two-stage hot alkali metal carbonate scrub designed for a selective removal of sulfur components. This process removed at most 40% of the COS in natural gas.

Ferrell et al. in *"Performance and Modelling of a Hot Potassium Carbonate Acid Gas Removal System in Treating Coal Gas"*, EPA Report No. EPA/600/7 87/023, November 1987, describe potassium carbonate scrubs for removing acid gases from gas streams. The COS absorption rate was always distinctly below the high $CO_2$ absorption rates.

COS can be substantially completely removed from a hydrocarbonaceous gas stream or from an LPG gas stream using physical solvents (cf. *"Gas Conditioning and Processing"*, Vol. 4, *Maddox, Morgan*). However, such processes are disadvantageous because of the high coabsorption rates of longer-chain hydrocarbons in the physical solvents, as product of value is either lost or has to be expensively recovered.

U.S. Pat. No. 4,808,765 describes a multistage process for treating sulfurous liquid or gaseous hydrocarbonceous streams where the fluid stream is initially contacted with a mixture of methyldiethanolamine (MDEA), which is a selective absorbant for $H_2S$, and diisopropanolamine (DIPA) whereby 50 to 80% of the COS is hydrolyzed to $H_2S$ and $CO_2$. A portion of the COS remaining in the fluid stream is then converted into $Na_2S$ or $Na_2CO_3$ in a caustic amine scrub. Finally, the remaining COS and any mercaptans present in the fluid stream are removed in an aqueous alkali metal hydroxide solution. Such a process, involving the use of three distinct scrubbing liquors which each have to be separately regenerated, as far as possible, is very complex in terms of equipment and correspondingly cost-intensive. In addition, DIPA—like other amines proposed in the literature for treating LPG, for example AEE or MEA—reacts irreversibly with COS, leading to high solvent losses. MEA recovery requires a thermal reclaimer, for example.

SUMMARY OF THE INVENTION

It is an object of the present invention to provide an equipmentwise very simple process for removing acid gas constituents from hydrocarbonaceous fluid streams whereby, as well as $CO_2$ and $H_2S$, COS in particular is substantially removed, so that mandated sulfur specifications can be achieved predictably and reliably.

We have found that this object is achieved by the process of the present invention. The invention accordingly provides a process for removing COS and further acidic gases from a hydrocarbonaceous fluid stream which contains $CO_2$, COS and possibly further acidic gases, especially $H_2S$ or mercaptans, as impurities, which comprises intimately contacting the fluid stream in an absorption or extraction zone with a scrubbing liquor comprising an aqueous amine solution containing from 1.5 to 5mol/l of an aliphatic alkanolamine of from 2 to 12 carbon atoms and from 0.4 to 1.7 mol/l of a primary or secondary amine as activator. COS is essentially completely removed from the fluid stream by the amine wash proposed according to the invention. Subsequently the substantially decontaminated fluid stream and the COS-loaded scrubbing liquor are separated and discharged from the absorption or extraction zone. The scrubbing liquor can subsequently be regenerated in a conventional manner and recycled back into the absorption or extraction zone.

DETAILED DESCRIPTION OF THE INVENTION

Figure 1:
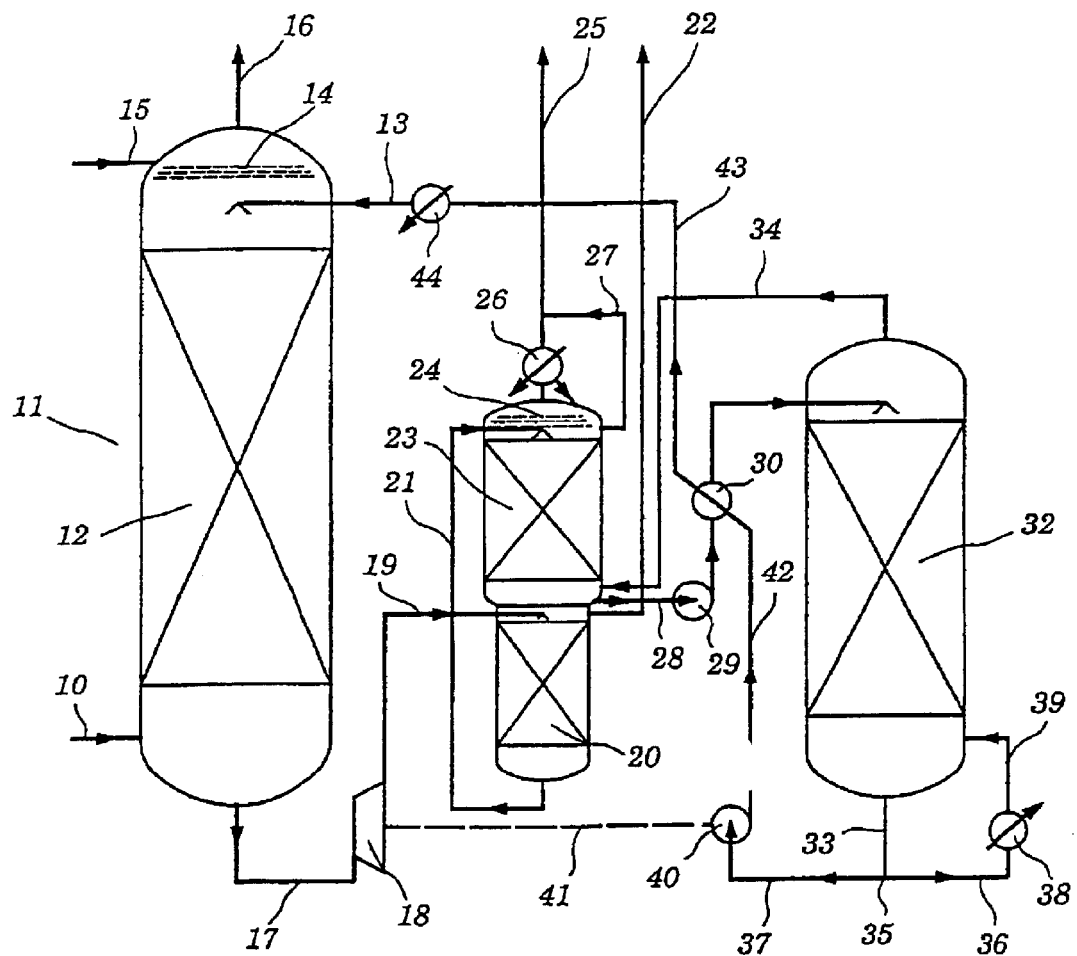
FIG. 1 shows an arrangement for carrying out the process of the invention.

As is known from the above-cited reference U.S. Pat. No. 4,336,233, for example, $H_2S$ and $CO_2$ are customarily removed using aqueous alkanolamine solutions containing less than 0.4 mol/l of a primary or secondary amine as activator. However, hitherto it had been assumed that complete COS removal is not possible using these solutions and that it is therefore necessary to provide additional processing steps if COS too is to be removed substantially, i.e., at more than 95% of the original COS content.

Surprisingly, by utilizing a higher concentration of the primary or secondary amine activator, the process of the invention provides essentially complete removal of the COS from the hydrocarbonaceous fluid stream. Whereas prior art activator concentrations provide significant removal of COS from the fluid stream only once $CO_2$ is already virtually 100% removed, the use of an aqueous amine solution containing from 0.4 to 1.7 mol/l of a primary or secondary amine as activator provides a substantially unspecific removal of $CO_2$ and COS. At mandated processing parameters, therefore, the same percentage of $CO_2$ and of COS is removed.

The removal of $CO_2$ and $H_2S$ from a hydrocarbonaceous fluid stream is familiar to those skilled in the art. There are already commercial program in existence which, on the basis of predetermined plant parameters and the specifications desired for the purified gas or LPG, are able to calculate the operating parameters for a certain scrubbing liquor (for example the TSWEET program from Brian Research & Engineering). The process of the invention makes it possible to dimension an amine scrub, for example, in such a way that 99% of the $CO_2$ present in the fluid stream is removed. The process of the invention ensures that, under these conditions, 99% of the COS in the fluid stream will be removed as well.

The scrubbing liquor used in the process of the invention preferably contains from 0.8 to 1.7 mol/l, particularly preferably from 0.8 to 1.2 mol/l, of the activator. At these preferred high activator concentrations, the process of the invention even makes it possible to remove COS selectively with respect to $CO_2$, i.e., to remove a higher percentage of COS than $CO_2$ from the hydrocarbonaceous fluid stream. Virtually complete removal of COS thus does not require the use of an uneconomical excess of scrubbing liquor. At higher activator concentrations resulting from an insufficient amount of solvent used, the process of the invention was even found to achieve a $CO_2$ breakthrough before any infringement of the COS specification.

The process of the invention thus provides for substantially complete removal of COS from the hydrocarbonaceous fluid stream. Depending on activator concentration, it is even possible to ensure that a residual level of $CO_2$— which in some applications may even be desirable—remains in the gas stream.

In the process of the invention, the total amine content of the scrubbing liquor is advantageously from 20 to 70% by weight, particularly preferably from 40 to 50% by weight.

The aliphatic alkanolamine used is preferably a tertiary alkanolamine, for example triethanolamine (TEA) or methyldiethanolamine (MDEA). The use of MDEA is particularly preferred for amine scrubs of hydrocarbonaceous gases, such as natural gas, while the use of TEA can be advantageous in the LPG scrub. For instance, U.S. Pat. No. 5,877,386 says that TEA-containing amine solutions are less soluble in LPG, which reduces the amine losses in the scrub.

The activator used is advantageously a primary or secondary alkanolamine or a saturated 5- or 6-membered N-heterocycle which optionally contains further heteroatoms selected from oxygen and nitrogen. The activator is advantageously selected from the group consisting of monoethanolamine (MEA), monomethylethanolamine (MMEA), diethanolamine (DEA), piperazine, methylpiperazine and morpholine. Piperazine is a particularly preferred activator for use in the process of the invention.

The present invention also provides a scrubbing liquor for removing COS from COS-containing hydrocarbonaceous fluid streams, comprising an aqueous amine solution containing from 1.5 to 5 mol/l of an aliphatic tertiary alkanolamine and from 0.8 to 1.7 mol/l, preferably from 0.8 to 1.2, mol/l of an activator comprising a saturated 5- or 6-membered N-heterocycle which optionally contains further heteroatoms selected from oxygen and nitrogen, the alkanolamine advantageously being a tertiary alkanolamine, preferably methyldiethanolamine (MDEA) or triethanolamine (TEA), and the activator preferably being piperazine or methylpiperazine.

By utilizing a conventional selective $H_2S$ absorbent such as MDEA, the scrubbing liquor of the invention additionally provides if substantial removal of $H_2S$ from the gas stream.

If the gas or LPG stream additionally includes mercaptans, the process of the invention may be followed by a further processing step to selectively remove mercaptans from the gas stream. To this end, for example, as described in U.S. Pat. No. 4,808,765, an aqueous alkali metal hydroxide solution (NaOH) can be used. Mercaptans can also be removed, as described in U.S. Pat. No. 4,462,968, by means of a scrubbing liquor comprising hydrogen peroxide or a combination of hydrogen peroxide with ammonia or with an amine.

The process of the invention can be carried out with the customary scrubbing means used in gas scrubbing or LPG scrubbing. Suitable scrubbing means, which ensure an intimate contact between the fluid stream and the scrubbing liquor, are for example randomly packed, structurally packed and plate columns, radial flow scrubbers, jet scrubbers, venturi scrubbers and rotational spray scrubbers, preferably structurally packed, randomly packed and plate columns.

The temperature of the scrubbing liquor in the absorption column is typically within the range from 40 to 70° C. at the top of the column and from 50 to 100° C. at the base of the column. The overall pressure in the column is generally within the range from 1 to 120 bar, preferably within the range from 10 to 100 bar.

The process of the invention can be carried out in one step or in a plurality of successive substeps. In the latter case, the fluid stream containing the acidic gas constituents is intimately contacted in each substep with a separate substream of the scrubbing liquor. For example, various locations in the absorption zone can be supplied with a substream in the absorbent, in which case—if an absorption column is used, for example—the temperature of the supplied scrubbing liquor in successive substeps generally decreases from the base to the top of the column.

The scrubbing liquor contaminated with acidic gas constituents can be regenerated and subsequently returned into the absorption zone with reduced contamination. Typically, in the course of the regeneration, the contaminated scrubbing liquor is decompressed from a relatively high pressure, prevailing in the absorption zone, to a lower pressure. Decompression can be accomplished by means of a throttle valve, for example. Additionally or alternatively, the scrubbing liquor can be passed through an expansion turbine with which a generator may be driven and electric energy may be obtained. The energy thus removed from the scrubbing liquor in the course of the expansion can be also used, for example, to drive liquid pumps in the scrubbing liquor recirculation system.

The removal of the acidic gas constituents to regenerate the scrubbing liquor can be effected, for example, in an expansion column, for example a vertical or horizontal flash vessel or a countercurrent column fitted with internals. There may be a plurality of consecutive expansion columns in which regeneration is effected at different pressures. For example, the scrubbing liquor can be initially regenerated in a pre-expansion column at high pressure, for example at about 1.5 bar above the partial pressure of the acidic gas constituents in the absorption zone, and then in a main expansion column at low pressure, for example at from 1 to 2 bar absolute. If a multistage expansion process is used, the first expansion column preferably removes inert gases, such as absorbed hydrocarbons, and the subsequent expansion columns, the acidic gas constituents.

Preferably, the scrubbing liquor to be regenerated is also subjected to a stripping process to remove further acid gases. To this end, the scrubbing liquor and a stripping agent, advantageously a hot gas (steam is preferred), is passed countercurrently through a desorption column equipped with random packings, structured packings or plates. Preferably, the stripping pressure is from 1 to 3 bar absolute at a temperature from 90 to 130° C.

A regeneration of the scrubbing liquor in a plurality of successive substeps in which the contamination of the scrubbing liquor with acid gas constituents decreases with every substep is described in, for example, U.S. Pat. No. 4,336,233, where a coarse scrub is carried out with an expansion cycle only and no stripping, and the contaminated scrubbing liquor is decompressed through an expansion turbine and regenerated stepwise in a pre-expansion column and a main expansion column. This variant is used in particular when the acidic gases to be scrubbed out have high partial pressures and when the clean gas has to meet only low purity requirements.

In a further preferred embodiment of the process of the present invention, the scrubbing liquor substreams used in successive substeps of the scrubbing or absorption process are obtainable through successive substeps of the regeneration process and have a decreasing contamination with acidic gas constituents. In a particularly preferred process, the feed gas or LPG containing the acidic constituents are intimately contacted in succession with a first substream of the scrubbing liquor (obtained after partial regeneration in an expansion column and prior to stripping) and a second substream of the scrubbing liquor (obtained after stripping).

For example, as described in U.S. Pat. No. 4,336,233, the absorption step can be carried out in two substeps, a coarse scrub and a fine scrub, and the regeneration step stepwise through decompression in an expansion turbine, a pre-expansion column and a main expansion column, and also through subsequent stripping. In this case, the substream of the scrubbing liquor for the coarse scrub can come from the main expansion column and the substream for the fine scrub from the stripping stage.

The regenerated absorbent, before it is introduced into the absorption zone, is customarily passed through a heat exchanger to adjust it to the temperature required for the scrub. For example, the regenerated scrubbing liquor leaving the stripping column can have heat removed from it and supplied to the scrubbing liquor still containing acid gas constituents prior to its entry into the stripping column.

The process of the invention can be carried out using typical plant configurations used for gas scrubbing and subsequent regeneration of the scrubbing liquor, as described for example in U.S. Pat. No. 4,336,233 for a one-stage or two-stage scrubbing process and particularly extensively in EP-A 0 322 924 for a single-stage scrubbing process featuring an expansion and stripping step. The two documents are hereby expressly incorporated herein by reference.

Figure 2:
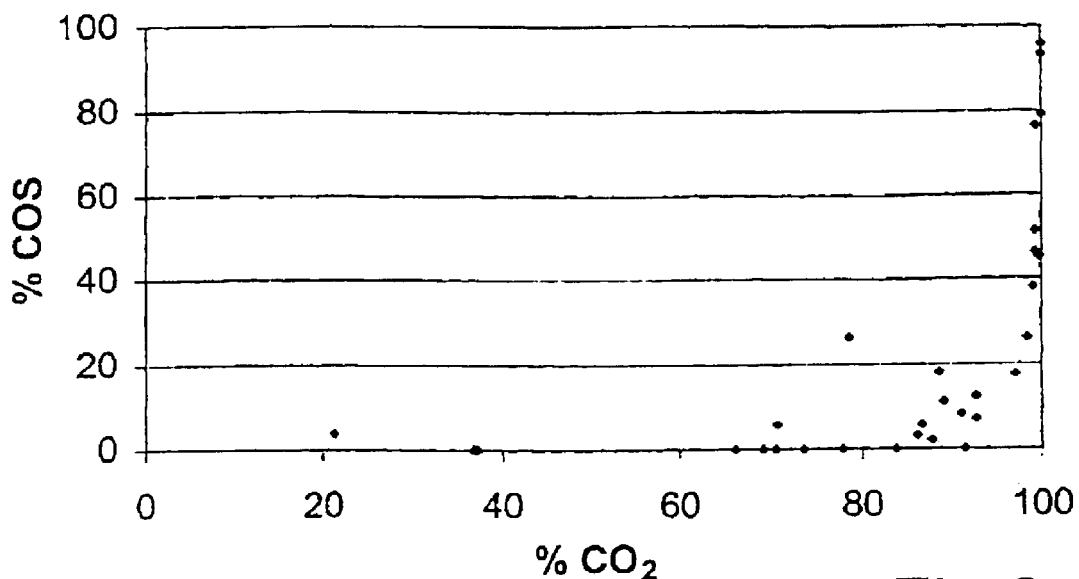
FIG. 2 shows the COS absorption rate as a function of the $CO_2$ absorption rate for a conventional scrubbing liquor.
Figure 3:
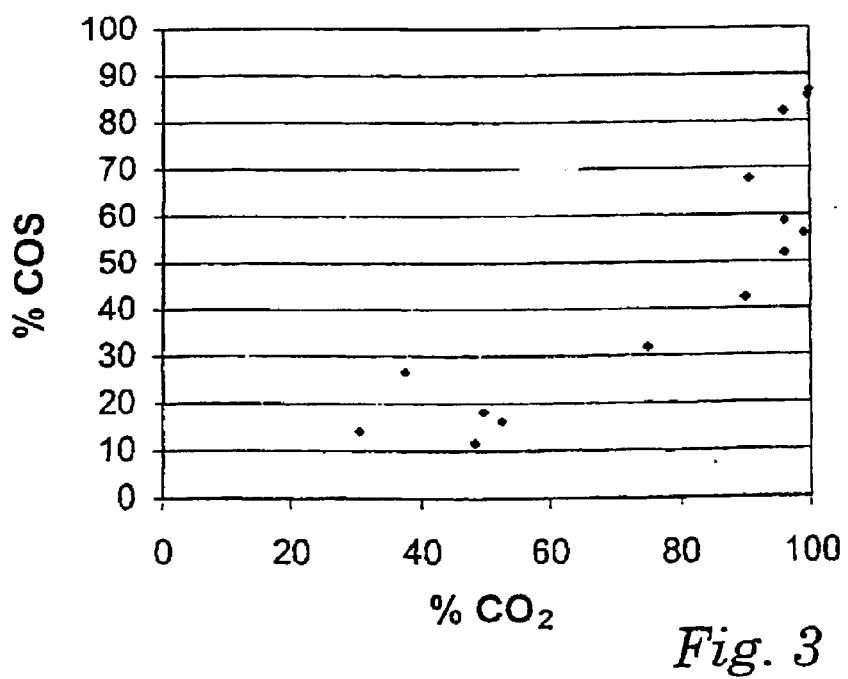
FIG. 3 shows the COS absorption rate as a function of the $CO_2$ absorption rate for a conventional scrubbing liquor.
Figure 4:
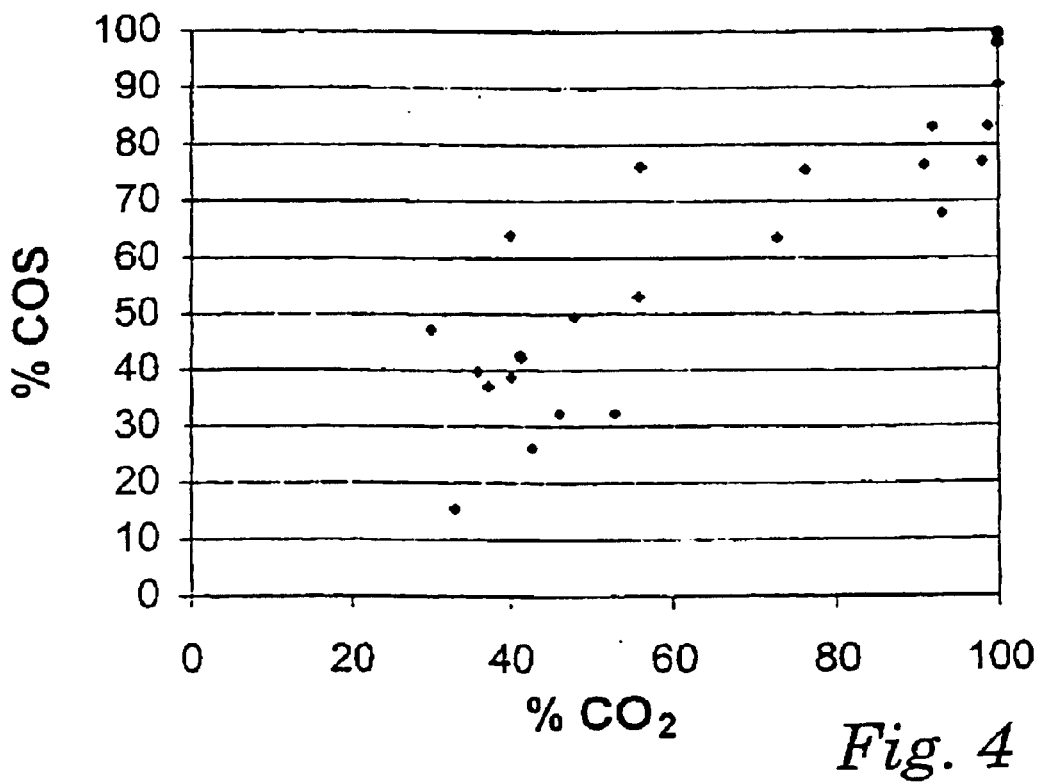
FIG. 4 shows the COS absorption rate as a function of the $CO_2$ absorption rate for a conventional scrubbing liquor.
Figure 5:
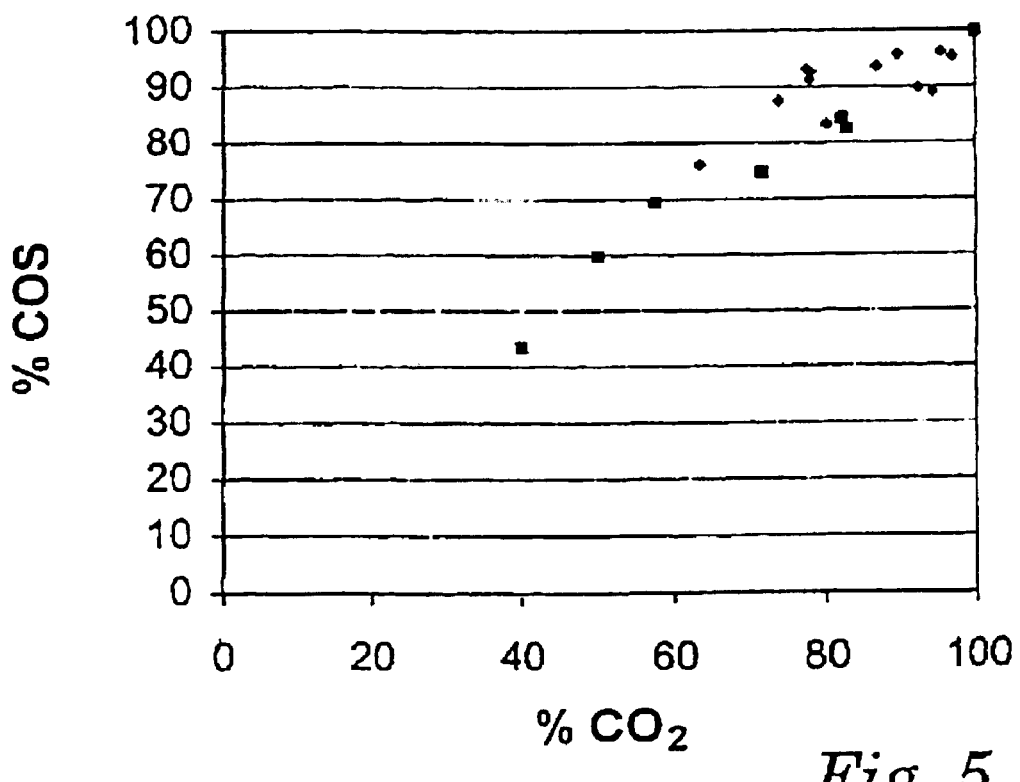
FIG. 5 shows the COS absorption rate as a function of the $CO_2$ absorption rate for a conventional scrubbing liquor.

The process of the invention will now be more particularly described with reference to the accompanying drawings, where:

FIG. 1 illustrates an example of the use of the process of the invention in a single-stage scrubbing process followed by a regeneration of the scrubbing liquor using expansion and stripping columns;

FIG. 2 illustrates a diagram plotting the COS absorption rate as a function of the $CO_2$ absorption rate for a conventional scrubbing liquor consisting of an aqueous solution of 3.46 mol/l of MDEA;

FIG. 3 illustrates a diagram corresponding to FIG. 2 for a conventional scrubbing liquor containing 3.39 mol/l of MDEA and 0.10 mol/l of piperazine;

FIG. 4 illustrates a,diagram corresponding to FIG. 2 for a conventional scrubbing liquor containing 3.20 mol/l of MDEA and 0.36 mol/l of piperazine;

FIG. 5 illustrates a diagram corresponding to FIG. 2 for a conventional scrubbing liquor containing 2.77 mol/l of MDEA and 0.96 mol/l of piperazine.

Referring to FIG. 1, a preferred arrangement can be seen for carrying out the process of the invention, as used for example for removing COS from a natural gas stream containing COS and further acid gases.

The fluid mixture, which may for example contain natural gas as product of value as well as acid gases such as $H_2S$, $CO_2$ and COS, is passed through a feed line 10 into an absorption column 11. Upstream of the point of entry into the absorption column there may be provided separating means (not depicted), for example to remove droplets of liquid from the crude gas. The absorption column 11 possesses an absorption zone 12 which ensures intimate contact between the acidic crude gas and a scrubbing liquor which is lean with regard to acid gases and which passes into the head region of the absorption column 11 via feed line 13 and is passed countercurrently to the gas to be treated. The absorption region 12 can be actualized for example in the form of plates, for example sieve or bubble cap plates, or through packing. Typically, the number of plates used is from 20 to 34. In the head region of the absorption column 11 there may be disposed from 1 to 5 backwash plates 14 so as to reduce the loss of volatile constituents of the scrubbing liquor. The backwash plates 14, constructed as bubble cap plates, for example, are fed via a condensate line 15 with water through which the treated gas is passed.

The natural gas stream substantially freed of acid gas constituents leaves the absorption column 11 via a head takeoff 16. The line 16, especially if no backwash plates are provided in the column 11, may be equipped on the inside with a separator (not depicted) to remove entrained scrubbing liquor from the gas stream.

Instead of the single-stage absorption facility described herein, it is also possible to use a two-stage variant as depicted for example in FIG. 2 of U.S. Pat. No. 4,336,233.

The scrubbing liquor containing acid gas leaves the absorption column 11 via line 17 and passes through an optional expansion turbine 18 and a line 19 into the head region of a first expansion column 20. In the expansion column 20, the scrubbing liquor pressure is suddenly decreased, so that the lighter hydrocarbons are able to evaporate from the scrubbing liquor. These hydrocarbons can be incinerated or returned into absorption column 11. The scrubbing liquor leaves the first expansion column 20 via line 21 at the base of the column, whereas the evaporated hydrocarbons are withdrawn via line 22 at the top of the expansion column 20.

In the depicted example, the scrubbing liquor then passes into a second expansion column 23, which can be configured as a low pressure flash column, for example. Less volatile acid gases evaporate off via the line 25, having passed through optional backwash plates 24. At the top of the second expansion column 23 there can be provided a heat exchanger with head distributor or condenser 26 to return entrained droplets of the scrubbing liquor into the expansion column. The condenser 26 can optionally be bypassed by a bypass line 27. The scrubbing liquor leaves the second expansion column 23 via line 28 and is pumped via pump 29 through a heat exchanger 30, where it takes up heat from the regenerated scrubbing liquor returned to the absorption column 11. The scrubbing liquor then passes into the head region of a stripping column 32, in which the scrubbing liquor passes countercurrently to a gas stream, for example steam. The stripping column 32 removes remaining acid gas constituents from the scrubbing liquor. The scrubbing liquor leaves the base region of the stripping column 32 via line 33, while the stripped-off acid gas constituents return via line 34 into the base region of the second expansion column 23. The scrubbing liquor leaving through the line 33 passes to a distributor 35 where a portion of the scrubbing liquor is transported via line 36 to a reboiler 38, which heats the liquid and returns it as vapor via line 39 into the stripping tube. Another portion of the scrubbing liquor passes from the distributor 35 via line 37 to a pump 40, which, as shown schematically in the form of the transfer path 41, is connected to the expansion turbine 18. The expansion turbine supplies a portion of the energy required to drive the pump 40. The regenerated scrubbing liquor, which is lean in acid gases, passes via line 42 into the heat exchanger 30, where it transfers heat to the scrubbing liquor passing via line 28 into the stripping column 32. The regenerated scrubbing liquor then passes through the lines 43 and 13 back into the absorption column 11 to again absorb acid gases. Upstream of the point of entry into the absorption column there can be provided a further heat exchanger 44 to cool the scrubbing liquor to the requisite feed temperature. Similarly, filters and other cleaning means (not depicted) can be provided so as to clean the scrubbing liquor prior to its entry into the absorption column 11.

The region of the lines 43, 13 may additionally be equipped with (not depicted) feed lines for fresh scrubbing liquor in the event that the required inflow rate cannot be maintained with regenerated scrubbing liquor alone.

The amount of inflowing scrubbing liquor can be controlled by means of the pumps and by means of (not depicted) valve and throttle means.

The invention will now be more particularly described with reference to experimental examples and to the diagrams depicted in FIGS. 2 to 5.

EXAMPLES

The absorption column of an experimental plant was fed with a natural gas composition containing the following impurities: 3 or 8% by volume of $CO_2$, 10% by volume of $H_2S$, from 25 to 150 ppm$_v$ of COS, from 120 to 160 ppm$_v$ of methyl mercaptan. The operating pressure of the absorber was varied in individual runs, being 40, 54 or 60 bar. The gas and liquid throughputs were calculated as a function of the particular absorber configuration used, the solvent used and the mandated operating parameters to obtain a certain $CO_2$ absorption rate.

The total amine content of the scrubbing liquor was in each case 40% by weight, based on the total liquor.

The diagrams of FIGS. 2 to 5 show the percentage of COS in the gas stream being removed at a certain $CO_2$ absorption rate.

The diagram of FIG. 2 illustrates the result of a comparative series of runs for a pure MDEA solution having a concentration of about 3.46 mol/l (about 40% by weight) of MDEA.

It can be seen that up to very high $CO_2$ absorption rates (above as 95% $CO_2$ removal) virtually no COS can be removed from the gas stream (absorption rate<20%). Significant fractions of COS are not removed from the gas stream until $CO_2$ removal is almost complete. However, a virtually 100% removal of the $CO_2$ from the gas stream is not possible in an economically acceptable manner, so that FIG. 2 constitutes impressive evidence that a pure MDEA scrubbing liquor is not suitable for COS removal.

FIG. 3 depicts the result of a comparative series of runs using a scrubbing liquor containing 3.39mol/l (39.2% by weight) of MDEA and 0.10mol/l (0.8% by weight) of piperazine. A somewhat improved absorption capacity for COS is apparent. However, there is still the problem that a larger fraction of COS can be achieved virtually only in the event of 100% removal of $CO_2$ from the fluid stream.

FIG. 4 depicts the result of a comparative series of runs using a scrubbing solution containing 3.20mol/l (37% by weight) of MDEA and 0.36mol/l (3% by weight) of piperazine, i.e., a solution having an activator concentration which is somewhat below the range proposed according to the invention. There is evidence of substantially unselective removal of $CO_2$ and COS up to absorption rates of about 80%, i.e., when from about 30 to 80% of the $CO_2$ in the gas stream are removed, from 30 to 80% of the COS in the gas stream will also be removed under these operating parameters. However, the diagram also shows that it is again necessary to remove virtually 100% of the $CO_2$ in order to be able to remove more than 90% of COS from the natural gas stream. Substantially complete removal of COS from the gas stream under these conditions is possible only with a very uneconomical excess mode of the process.

For substantially complete removal of COS, i.e., for removal of more than 95% of COS from the gas stream, the invention therefore proposes using a scrubbing liquor having an activator content of more than 0.4 mol/l. The results of a corresponding series of runs depicted in FIG. 5 impressively confirm the advantages of the process of the invention. The aqueous scrubbing liquor used contained 2.77mol/l (32% by weight) of MDEA and 0.96mol/l (8% by weight) of piperazine. It can be seen here that COS is removed from the gas stream selectively with respect to $CO_2$.

If, for example, compliance with international sulfur specification requires removal of more than 95% of COS from a natural gas stream, this can be accomplished—as can be seen from the diagram of FIG. 5—at a $CO_2$ absorption rate of below 95%. The process of the invention thus makes it possible to remove COS until the requisite sulfur specifications are achieved without complete removal of $CO_2$ from the gas stream.

The process of the invention couples the COS absorption rate to the $CO_2$ absorption rate. Commercially available software for $CO_2$ and $H_2S$ removal by means of amine scrubs can therefore be used to determine the operating parameters required for substantial COS removal. Operating parameters enabling 95% removal of $CO_2$, for example, will also remove at least 95% of the COS in the gas stream in the process of the invention.

The diagram of FIG. 5 also shows that variations in the $CO_2$ content of the gas stream have no effect on the absorption ratio of COS and $CO_2$. The plot points depicted as squares were determined at a $CO_2$ content of 8% by weight, whereas the plot points depicted as diamonds correspond to a $CO_2$ content of 3% by weight. The two series of measurements follow the same curve.

We claim:

1. A process for selectively removing COS with respect to $CO_2$ from a hydrocarbonaceous fluid stream which contains $CO_2$; and COS comprising:

intimately contacting the fluid stream in an absorption or extraction zone with a scrubbing liquor consisting of an aqueous amine solution containing from 1.5 to 5 mol/l of an aliphatic alkanolamine having of from 2 to 12 carbon atoms and from 0.8 to 1.7 mol/l of at least one activator selected from the group consisting of piperazine, methyl piperazine and morpholine, removing the COS essentially completely from the fluid stream, and separating the substantially COS-decontaminated fluid stream and the COS-loaded scrubbing liquor and discharging them from the absorption or extraction zone.

2. The process as claimed in claim 1, wherein the scrubbing liquor contains from 0.8 to 1.2 mol/l, of the activator.

3. The process as claimed in claim 1, wherein a total amine content of the scrubbing liquid is from 20 to 70% by weight.

4. The process as claimed in claim 1, wherein the alkanolamine used is tertiary alkanolamine.

5. The process as claimed in claim 4, wherein the tertiary alkanolamine is methyldiethanolamine.

6. The process as claimed in claim 4, wherein the tertiary alkanolamine is triethanolamine.

7. The process as claimed in claim 1, wherein a total amine content of the scrubbing liquid is from 40 to 50% by weight.

8. The process as claimed in claim 1, wherein the same percentage of $CO_2$ and COS is removed.

9. The process as claimed in claim 1, wherein 99% of the COS in the fluid stream is removed.

10. The process as claimed in claim 1, wherein a temperature of the scrubbing liquor at the top of the absorption zone is 40 to 70° C. and 50 to 100° C. at the bottom.

11. The process as claimed in claim 1, wherein a pressure in the absorption zone is 1 to 120 bar.

12. The process as claimed in claim 1, wherein a pressure in the absorption zone is 10 to 100 bar.

13. The process as claimed in claim 1, further comprising regenerating the scrubbing liquor.

14. The process as claimed in claim 1, wherein said hydrocarbonaceous fluid stream is selected from the group consisting of natural gas, synthesis gas from heavy oil or heavy residues or refinery gas, and synthesis gas from liquid or liquefied hydrocarbons.

* * * * *